United States Patent [19]

Sellers

[11] Patent Number: 4,478,583
[45] Date of Patent: Oct. 23, 1984

[54] TEACHING DEVICE FOR SEVERELY RETARDED OR PHYSICALLY HANDICAPPED

[76] Inventor: Janet R. Sellers, 3211 Brentwood Rd., Raleigh, N.C. 27604

[21] Appl. No.: 544,488

[22] Filed: Oct. 24, 1983

[51] Int. Cl.³ .......................... G09B 1/06; A63F 9/10
[52] U.S. Cl. ................................. 434/259; 273/157 R
[58] Field of Search ............................. 434/259, 430; 273/157 R, 156

[56] References Cited

U.S. PATENT DOCUMENTS

| 207,124 | 8/1878 | Kinsey | 273/157 R |
| 1,225,305 | 5/1917 | Barnard | 434/430 |

FOREIGN PATENT DOCUMENTS 172434  6/1906  Fed. Rep. of Germany ...... 434/259

OTHER PUBLICATIONS

Childcraft "Toys That Teach," ©1970, Form Puzzle 1 sheet.
Teaching Resources Catalog 1980, Title page, pp. 88,90.

*Primary Examiner*—William H. Grieb
*Attorney, Agent, or Firm*—Mills & Coats

[57] ABSTRACT

The present invention entails a teaching device for severely retarded and physically handicapped individuals. A separable teaching board is provided which includes a plurality of detachable board sections. Each board section includes indented cutouts formed in the face thereof, with the indented cutouts being of a selected shape. Further there is provided a plurality of inserts formed in like selected shapes for being inserted into certain cutouts. An individual is taught to effectively match a given insert with a like shaped cutout by manipulating and positioning the insert within the matching cutout.

6 Claims, 5 Drawing Figures

TEACHING DEVICE FOR SEVERELY RETARDED OR PHYSICALLY HANDICAPPED

FIELD OF INVENTION

The invention relates to educational and teaching devices and more particularly to a matching type teaching device especially designed for retarded, severely retarded and physically handicapped individuals.

BACKGROUND OF INVENTION

Teaching the trainably retarded, severely retarded and physically handicapped is a challenging and difficult assignment. Federal, State and local governments now recognize the need for adequately teaching and educating these people. Teachers within the State and local school systems are committed and dedicated to providing effective teaching programs for these individuals.

Teaching retarded, severely retarded and physically handicapped individuals has been greatly hampered by the lack of effective materials designed for these individuals and their needs. The real problem is that such materials do not exist. Teachers are left with teaching materials not suited for these individuals and their learning disability. Teachers having the responsibility of teaching retarded, severely retarded and physically handicapped individuals often attempt to improvise and create their own teaching material to meet the needs of these individuals. This obviously is not efficient, not to mention the additional work and burden that such places on a teacher with a very demanding position.

Therefore, there has been and continues to be a need for teaching materials specifically designed to meet the needs of trainably retarded, severely retarded and physically handicapped individuals.

SUMMARY AND OBJECTS OF INVENTION

The present invention presents a teaching device specifically designed for trainably and severely retarded and physically handicapped individuals and their particular learning disorders. Specifically, the present invention comprises a teaching device that centers around matching one geometrical shape or object shape with another like shape. To accomplish this, a shape such as a square, triangle or apple is provided in the form of an indented cutout in a teaching board. Inserts of like shape are also provided. In exercising this teaching device, the severely retarded or physically handicapped individual attempts to match an insert with a like shaped cutout. In this process the individual actually attempts to manipulate and position the insert such that it fits appropriately within the formed indented cutout.

Each indented cutout is formed in the face of a separable board section and respective board sections are provided with interconnecting means such that they can be readily attached and detached.

Therefore, a principal object of the present invention resides in the provision of a teaching device that is specifically designed for retarded, severely retarded and physically handicapped individuals.

A further object of the present invention resides in the provision of a teaching device that is directed at the learning disorders and disabilities of a severely retarded and/or physically handicapped individuals.

A further object of the present invention is to provide an effective and workable teaching device for a severely retarded and/or physically handicapped individual that inherently possesses a very basic and fundamental approach to teaching and which can be broken down to very basic elements and which can be added to as the individual masters such tasks or assignments.

It is also an object of the present invention to provide a teaching device of the character referred to above that is designed to enable an individual using such a device to obtain early success and thereby be rewarded earlier than other teaching approaches.

A further object of the present invention resides in the provision of a teaching device of the character referred to above that is designed to help severely retarded and/or physically handicapped individuals with their reasoning ability.

A further object of the present invention resides in the provision of a teaching device of the basic character discussed hereinabove which can be used in psychological testing.

It is also an object of the present invention to provide a teaching device of the character referred to above that is interesting and attractive to retarded, severely retarded and/or physically handicapped individuals and which is designed to minimize frustration on the part of an individual using such a teaching device.

A further object of the present invention resides in the provision of a board type teaching device for the severely retarded and/or physically handicapped of the character referred to above that is relatively simple in construction, easy to manufacture and which could be commercialized at a relatively inexpensive price.

Other objects and advantages of the present invention will become apparent from a study of the following description and the accompanying drawings which are merely illustrative of the present invention.

BOARD TYPE TEACHING DEVICE FOR SEVERELY RETARDED AND PHYSICALLY HANDICAPPED

Figure 1:
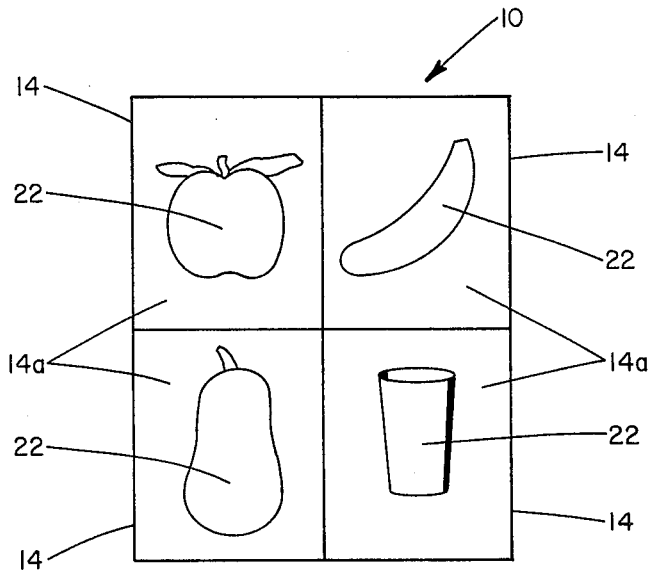
FIG. 1 is a top plan view of the teaching device of the present invention illustrating one particular teaching board comprising a group of board sections with each board section including a particular puzzle design.

With further reference to the drawings, it is seen that the teaching device of the present invention is shown therein and indicated generally by the numeral 10. Teaching device 10 comprises a teaching board, indicated generally by numeral 12. Teaching board 12 includes a plurality of separable but mating board sections 14. As will be appreciated from subsequent portions of this disclosure, the respective board sections 14 can be readily attached and detached with respect to each other.

Each board section includes a face 14a and a series of side edges with each side edge being referred to by 14b. As illustrated in the drawings, it is seen that the respective board sections 14 are generally rectangular or square and as such include four side edges 14b.

Figure 4:
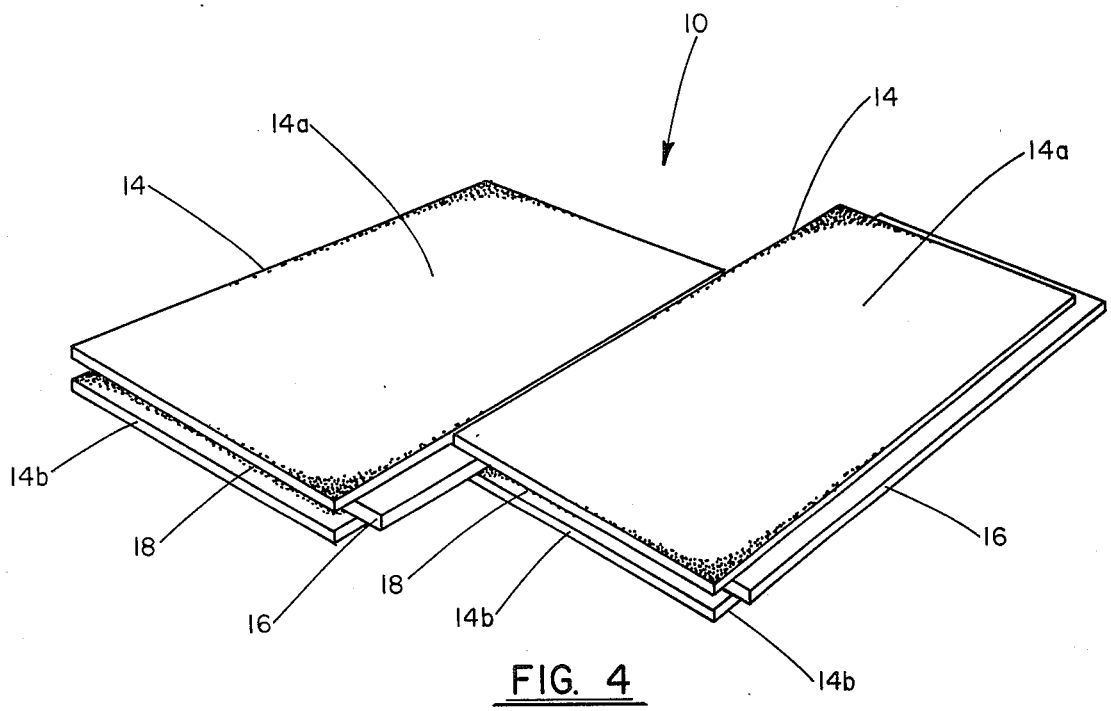
FIG. 4 is a perspective view of two board sections being joined together, with this view particularly illustrating the interconnecting means utilized for attaching and detaching the respective board sections of the teaching device of the present invention.

Each respective board section 14 of teaching board 12 includes means for interconnecting the respective board sections together in side-by-side relationship, as illustrated in FIG. 4. When connected in side-by-side relationship, it is seen that a pair of side edges 14b from at least two board sections 14 abut together to effectively form a joint in teaching board 12. To provide this interconnecting means, teaching board 12 is provided with a tongue and groove attaching structure. Specifically, each board section 14 is provided with a tongue 16 that projects outwardly from two side edges 14b of the respective board section 14. In the design illustrated herein, tongue 16 extends around two adjacent side edges 14b. Formed about the other two side edges 14b of the respective board section 14 is a continuous groove 18. It is appreciated that groove 18 is formed inwardly into the board section 14 from respective side edges 14b. Further groove 18 can be of a thickness generally equal to the thickness of tongue 16 in order that a respective tongue 16 can be inserted and received in a snug relationship within groove 18. By strategically placing the tongue 16 about two adjoining side edges 14b of a board section while placing groove 18 on the remaining two side edges 14b of the same board section 14, it is appreciated that additional board sections 14 can be added to form a teaching board of any number of board sections.

The present invention entails a teaching device that is specifically designed for teaching severely retarded and physically handicapped individuals, especially young children. In providing such a teaching device, the present invention has been designed and developed to revolve around a puzzle type approach entailing matching one shape to another like shape.

Figure 5:
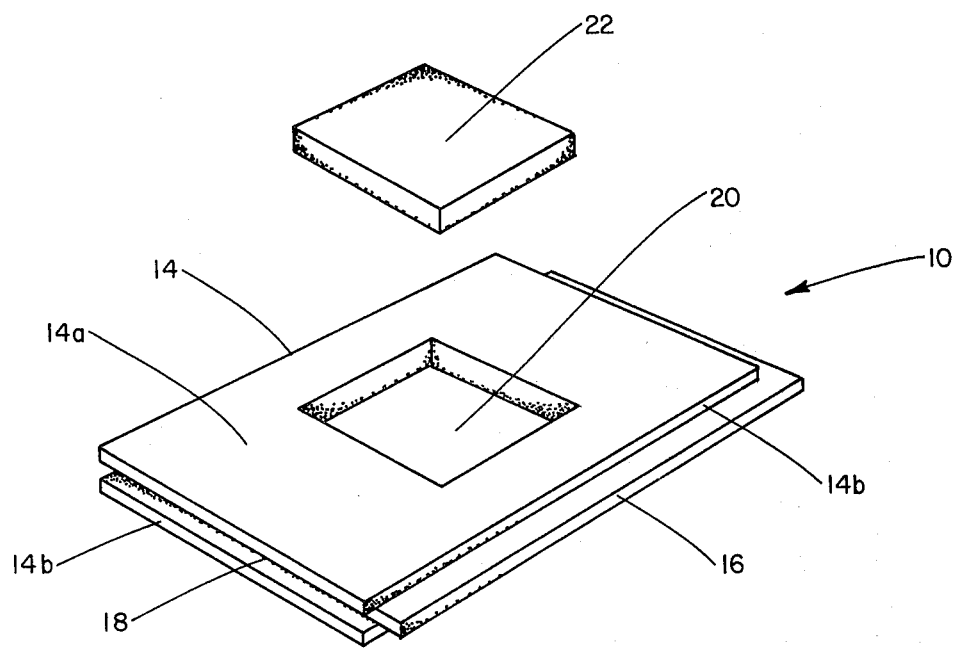
FIG. 5 is a perspective view of a single board section illustrating the placement of a selected insert into a matched cutout opening.

To accomplish this, each board section is provided with an indented cutout 20 of a particular shape (FIG. 5). The indented cutout 20 can be of a geometrical shape such as a square, rectangle, triangle or circle, or could be in the form of an object shape such as an apple, banana, pear, glass of milk or spoon.

Further, the teaching device of the present invention includes a plurality of like shaped insert means 22. For each particular shaped cutout 20, there is provided a like shaped insert means 22. For example in FIG. 5, cutout 20 assumes a square shape. The matched insert means therefor is a square insert 22. To match other cutouts referred to herein, the teaching device 10 of the present invention could include inserts shaped in the form of a square, rectangle, triangle, circle or in the shape of such objects as an apple, banana, pear, glass of milk or spoon.

Figure 2:
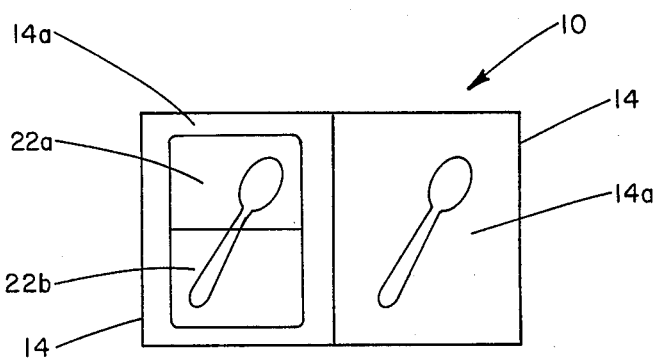
FIG. 2 is a plan view of the board type teaching device of the present invention illustrating what is referred to as a "halves to whole puzzle".
Figure 3:
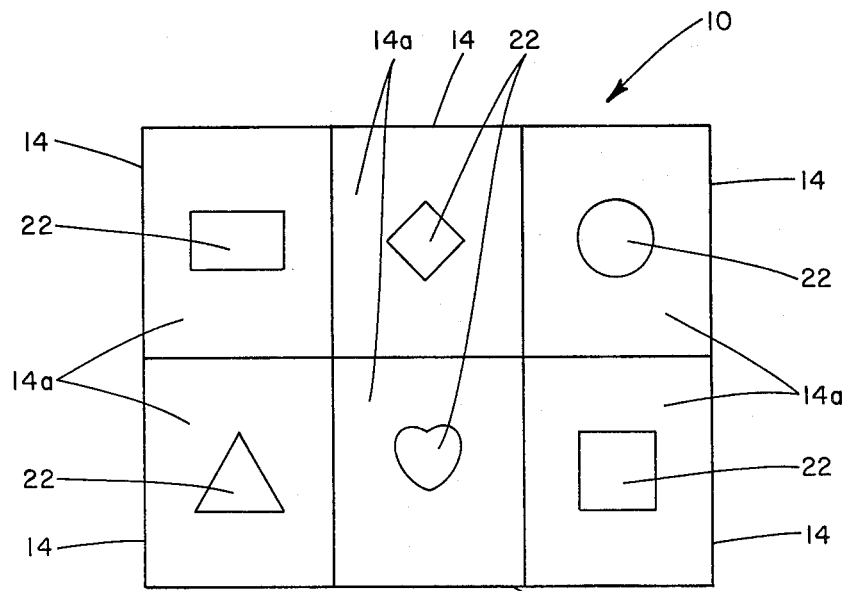
FIG. 3 is a plan view of the same board type teaching device of the present invention showing a third teaching board comprising a group of board sections with particular geometrical shaped puzzles formed therein.

Turning to FIGS. 1 through 3, therein three teaching devices 10 are illustrated. First, in FIG. 1, there is shown a four sectional teaching board 12. Each of the board sections 14 comprising this teaching board are designed to attach and detach just as discussed hereinabove and as particularly illustrated in FIG. 4. In the case of the teaching device shown in FIG. 1, it is appreciated that the cutouts are formed in the shape of an apple, banana, pear and glass of milk. Likewise, the inserts 22 provided for this teaching board would be in like shapes of an apple, banana, pear or glass of milk.

FIG. 2 illustrates what is referred to as a "halves to whole puzzle". This teaching device includes two board sections 14a. The leftmost board section includes a rectangular cutout for receiving two inserts 22a and 22b. Inserts 22a and 22b when properly positioned, as illustrated in FIG. 2, depict a spoon. In the case of the design of the teaching device of FIG. 2, the board section 14a formed on the right side has as a spoon depicted or drawn thereon. In actual use, the individual utilizing this teaching board views the drawn or depicted spoon on the right side and attempts to position the two inserts 22a and 22b together to form that very spoon and at the same time attempts to place those two inserts 22a and 22b within the cutout formed to receive the same.

Now turning to FIG. 3, it is seen that the teaching board 12 of the present invention includes six board sections 14, three on the top, three on the bottom. As shown therein, the respective cutouts and inserts are in the form of a rectangle, diamond, circle, triangle, heart and square.

It is appreciated that the various teaching boards illustrated in FIGS. 1 through 3 include the basic tongue and groove connecting structure referred to hereinabove and particularly illustrated in FIGS. 4 and 5. This enables any number of board sections 14 to be separated from other board sections that might comprise an entire teaching board 12. Consequently, the teacher can in some instances detach a single board section and allow the student to work with that until he has mastered matching the one insert with the cutout and has actually learned to properly manipulate and position the insert within the cutout. Next, the teacher may wish to add an additional board section and request the individual to properly insert both inserts. From this point on, the teacher can continue to add board sections as warranted.

It is appreciated that individual board sections 14 can be constructed of any number of suitable materials including molded plastic. However, in the present disclosure, the particular material illustrated is wood. In this regard, it should be noted that the respective board sections 14 can be constructed of a single piece of wood.

In the alternative, it is contemplated that respective board sections 14 could be laminated by securing three generally flat thin pieces of material together in back-to-back relationship. Viewing FIG. 4, it is seen that the front face material could comprise a first member and be secured to an intermediate member which would in turn be secured to a lower bottom member. In this case the intermediate member would be of an area approximately the same as the area of the upper face member and would be phased or shifted such that two edge portions extend outwardly from the upper and lower member to form the tongue 16. The shifting of this member would create the necessary groove 18.

From the foregoing specification and discussion, it is appreciated that the present invention presents a teaching device specifically designed and developed for severely retarded and physically handicapped individuals. The teaching device of the present invention assists in developing reasoning ability for young severely retarded children and other individuals as well. In addition it has the potential to be used in psychological testing. Moreover, the teaching device of the present invention presents a very basic tool for teaching retarded and physically handicapped individuals inasmuch as it is progressive and can be broken down to very fundamental starting units. After the individual has mastered a fundamental unit, then a second unit or board section can be added that will further challenge the individual. Finally the teaching device of the present invention is designed to minimize the time period for achieving success and consequently has the advantage of rewarding a young child or individual earlier than other types of teaching approaches.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A teaching device for severely retarded and/or physically handicapped individuals comprising: a separable board including a plurality of individual matching board sections with each board section including a face and a surrounding outer edge; detachable connecting means formed on respective board sections for interconnecting selected board sections together such that one board section can be detached and removed from another board section and said teaching device; said detachable securing means including tongue means projecting outwardly from the edge of selected board sections and groove means formed inwardly within the edge of selected board sections wherein the tongue and groove means are designed to mate with each other such that when joined together board sections thereof are secured together in side-by-side relationship; indented cutouts of a selected shape formed in the face of certain board sections; and a plurality of insert means with selected insert means being formed into a certain shape that matches the shape of a selected indented cutout in order that an individual may attempt to match a certain insert means with a certain indented cutout by attempting to fit the certain insert means within a certain cutout formed on a board section.

2. The teaching kit of claim 1 wherein selected board section of said teaching kit includes four side edges wherein said tongue means includes an outwardly projecting tongue extending from two sides of said four-sided board section and wherein said groove means is formed along the other two sides of said four-sided board section and wherein said groove means includes a groove that extends inwardly into the respective board section from said edges.

3. The teaching kit of claim 2 wherein said outwardly projecting tongue of a particular board section projects outwardly from two adjoining sides that meet to form a ninety-degree angle, and wherein said groove means is formed on the two remaining side edges that also meet to form a ninety-degree angle.

4. The teaching device of claim 1 wherein selected board sections include a plurality of horizontal laminates including a first upper laminate, a second laminate disposed below said first upper laminate; and wherein said cutouts of said selected board section is formed by cutting entirely through said first upper laminate such that when said first upper laminate is disposed adjacent and over said second laminate, said second laminate forms a bottom surface of said indented cutout.

5. A teaching kit for gradually increasing the learning and skill level of severely retarded children comprising: an expandable teaching and exercise board assembly for teaching severely retarded children and gradually increasing their learning and skill level, said expandable teaching and exercise board assembly including a plurality of separable and independent exercise board sections with each board section including a separate and distinct matching exercise and wherein the respective and independent exercise board sections may be added to each other, one at a time, to form various combinations of expanded board assemblies with various numbers of exercise board sections included so as to vary and increase the difficulty level presented by the particular board assembly formed; each exercise board section including a face and a surrounding outer edge and detachable connecting means formed on respective exercise board sections for interconnecting selected exercise board sections together such that one board section can be added or removed with respect to another board section so as to change the respective tasks presented by the individual exercise board sections of the expandable board assembly; said detachable connecting means including tongue means projecting outwardly from the edge of selected board sections and groove means formed inwardly within the edge of selected board sections wherein the tongue and groove means are designed to mate with each other such that when joined together board sections thereof are secured together in side-by-side relationship; each exercise board section including indented cutouts of a selected shape formed in the face thereof and a plurality of insert means with selected insert means being formed into a certain shape that matches the shape of a selected indented cutout in order that an individual for each exercise board section of a particular board assembly may attempt to match a certain insert means with a certain indented cutout by attempting to fit certain insert means within a certain cutout formed on a board section.

6. A method of teaching severely retarded children by gradually increasing the level of skill required to accomplish certain matching tasks comprising the steps of: providing a teaching kit with a plurality of separate and distinct matching exercise board sections; presenting a first matching exercise to the severely retarded student including one or more matching exercise board sections which form a first exercise board assembly; increasing gradually the skill level required of the severely retarded child by connecting at least one additional matching exercise board section to said first exercise board assembly to form a second exercise board assembly having a greater level of difficulty than said first matching exercise board assembly; and continuing to increase the difficulty and skill level required of the severely retarded child by still adding further separate and distinct matching exercise board sections from said kit to said second matching exercise board assembly to form additional matching exercise board assemblies so as to increase the level of skill required by the severely retarded child in order to complete each of the respective matching exercises.

* * * * *